US011769504B2

(12) United States Patent
Flores et al.

(10) Patent No.: US 11,769,504 B2
(45) Date of Patent: Sep. 26, 2023

(54) VIRTUAL MEETING CONTENT ENHANCEMENT TRIGGERED BY AUDIO TRACKING

(71) Applicant: INTERNATIONAL BUSINESS MACHINES CORPORATION, Armonk, NY (US)

(72) Inventors: Romelia H. Flores, Keller, TX (US); Paul Llamas Virgen, Zapopan (MX); Carolina Garcia Delgado, Zapopan (MX); Silvia Cristina Santa Ana Velasco, Guadalajara (MX); Perla Guadalupe Reyes Ramirez, Zapopan (MX)

(73) Assignee: International Business Machines Corporation, Armonk, NY (US)

( * ) Notice: Subject to any disclaimer, the term of this patent is extended or adjusted under 35 U.S.C. 154(b) by 232 days.

(21) Appl. No.: 17/355,573

(22) Filed: Jun. 23, 2021

(65) Prior Publication Data
US 2022/0415317 A1 Dec. 29, 2022

(51) Int. Cl.
*G10L 15/22* (2006.01)
*G10L 15/08* (2006.01)
(Continued)

(52) U.S. Cl.
CPC ............. *G10L 15/22* (2013.01); *G06F 3/167* (2013.01); *G06F 40/279* (2020.01); *G10L 15/08* (2013.01);
(Continued)

(58) Field of Classification Search
USPC .................................................... 704/1–504
See application file for complete search history.

(56) References Cited

U.S. PATENT DOCUMENTS 7,634,540 B2    12/2009   Ivashin
9,049,338 B2     6/2015   Witt
(Continued)

FOREIGN PATENT DOCUMENTS

JP      2019096330 A     6/2019

OTHER PUBLICATIONS nesuke.com, "[Remote Desktop] Mechanism and Security Enhancements—Internet Connection and Encryption," Apr. 7, 2020, 14 pgs. English translation and 13 pgs. original article, [accessed Jul. 23, 2021], Retrieved from the Internet: <https://milestone-of-se.nesuke.com/sv-basic/windows-basic/remote-desktop-security/>, Machine Translated.

(Continued)

*Primary Examiner* — Marcus T Riley
(74) *Attorney, Agent, or Firm* — Caleb D. Wilkes

(57) ABSTRACT

A method, computer system, and a computer program product for digital remote presentation are provided. Presentation content is received that includes visual content, one or more speech triggers, and one or more presentation enhancements corresponding to the one or more speech triggers. A virtual meeting is presented by transmitting the presentation content to at least one receiver computer. A first audio file is received that includes recorded audio spoken by a presenter during the virtual meeting. From the first audio file the one or more speech triggers spoken by the presenter are identified. The respective presentation enhancement corresponding to the identified speech trigger is performed. The presentation enhancement is presented to the at least one receiver computer during the virtual meeting.

20 Claims, 8 Drawing Sheets

(51) Int. Cl.
*G06F 40/279* (2020.01)
*G06F 3/16* (2006.01)
*G10L 15/30* (2013.01)
*H04L 67/565* (2022.01)

(52) U.S. Cl.
CPC ............ G10L 15/30 (2013.01); H04L 67/565 (2022.05); *G10L 2015/088* (2013.01); *G10L 2015/223* (2013.01)

(56) References Cited

U.S. PATENT DOCUMENTS

| | | | |
|---|---|---|---|
| 9,372,543 B2* | 6/2016 | Lo | G06F 3/0481 |
| 9,386,275 B2 | 7/2016 | Oyman | |
| 9,514,333 B1 | 12/2016 | Patel | |
| 9,635,091 B1 | 4/2017 | Laukkanen | |
| 9,992,245 B2 | 6/2018 | Deluca | |
| 10,402,076 B2 | 9/2019 | Sherman | |
| 10,474,416 B1 | 11/2019 | Farivar | |
| 10,776,073 B2 | 9/2020 | Lenke | |
| 10,809,895 B2 | 10/2020 | Denoue | |
| 11,269,426 B2* | 3/2022 | Jorasch | G06F 3/167 |
| 11,385,726 B2* | 7/2022 | Jorasch | G06Q 10/103 |
| 11,567,586 B2* | 1/2023 | Jorasch | G06F 3/167 |
| 2009/0300510 A1 | 12/2009 | Gantman | |
| 2011/0010629 A1 | 1/2011 | Castro | |
| 2013/0073965 A1 | 3/2013 | Sik | |
| 2013/0139076 A1 | 5/2013 | Mochizuki | |
| 2014/0109210 A1* | 4/2014 | Borzycki | A63F 13/213 726/7 |
| 2015/0106227 A1 | 4/2015 | Gottlieb | |
| 2015/0169069 A1* | 6/2015 | Lo | H04L 65/403 715/753 |
| 2015/0222755 A1 | 8/2015 | Chintala | |
| 2015/0381935 A1 | 12/2015 | Thomas | |
| 2016/0170617 A1 | 6/2016 | Shi | |
| 2017/0118258 A1 | 4/2017 | Lieb | |
| 2017/0255345 A1 | 9/2017 | Veeramani | |
| 2018/0131904 A1* | 5/2018 | Segal | G11B 27/031 |
| 2020/0110572 A1 | 4/2020 | Lenke | |
| 2020/0210057 A1 | 7/2020 | Yoshihashi | |
| 2021/0065584 A1 | 3/2021 | O'Reilly | |
| 2021/0373676 A1* | 12/2021 | Jorasch | A63F 13/213 |
| 2022/0011878 A1* | 1/2022 | Jorasch | A63F 13/428 |
| 2022/0300093 A1* | 9/2022 | Jorasch | A63F 13/79 |
| 2022/0415317 A1* | 12/2022 | Flores | G06F 3/167 |

OTHER PUBLICATIONS

Yoosh, "Remote development and debugging with visual studio 2019 source code," Nov. 23, 2019, 12 pgs. English translation and 11 pgs. original article, [accessed Jul. 23, 2021], Retrieved from the Internet: <https://blog.goo.ne.jp/yoossh/e/10fa6e6ee04bb27df467db671304071f>, Machine Translated.

Disclosed Anonymously, "Agile presentation method through web conferencing," IP.com, May 6, 2009, 5 pages, IP.com No. IPCOM000182820D, Retrieved from the Internet: <URL: https://priorart.ip.com/IPCOM/000182820>.

Disclosed Anonymously, "Dynamic and live highlighting parts of a presentation," IP.com, Nov. 29, 2011, 3 pages, IP.com No. IPCOM000212807D, Retrieved from the Internet: <URL: https://priorart.ip.com/IPCOM/000212807>.

Disclosed Anonymously, "Method for Controlling the Dynamic Augmentation of Presented Visual Content by Monitoring a Pointing Device," IP.com, Mar. 6, 2020, 4 pages, IP.com No. IPCOM000261462D, Retrieved from the Internet: <URL: https://priorart.ip.com/IPCOM/000261462>.

Disclosed Anonymously, "The system and method for enlarging objects dynamically in presentation," IP.com, May 27, 2014, 14 pages, IP.com No. IPCOM000237005D, Retrieved from the Internet: <URL: https://priorart.ip.com/IPCOM/000237005>.

Mell et al., "The NIST Definition of Cloud Computing", Recommendations of the National Institute of Standards and Technology, NIST Special Publication 800-145, Sep. 2011, 7 pages.

* cited by examiner

VIRTUAL MEETING CONTENT ENHANCEMENT TRIGGERED BY AUDIO TRACKING

BACKGROUND

The present invention relates generally to digital remote meetings and to computer features which allow a heightened experience for participants of digital remote meetings.

SUMMARY

According to one exemplary embodiment, a method for digital remote presentation is provided. A method, computer system, and a computer program product for digital remote presentation are provided. Presentation content is received that includes visual content, one or more speech triggers, and one or more presentation enhancements corresponding to the one or more speech triggers. A virtual meeting is presented by transmitting the presentation content to at least one receiver computer. A first audio file is received that includes recorded audio spoken by a presenter during the virtual meeting. From the first audio file the one or more speech triggers spoken by the presenter are identified. The respective presentation enhancement corresponding to the identified speech trigger is performed. The presentation enhancement is presented to the at least one receiver computer during the virtual meeting. A computer system and computer program product corresponding to the above method are also disclosed herein.

BRIEF DESCRIPTION OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The following described exemplary embodiments provide a method, computer system, and computer program product for dynamic content enhancement in virtual meetings to improve the viewing and learning experience of individuals who are receiving the virtual meeting. Business, schools, social groups, etc. are spending more time using virtual meeting tools that allow users at different physical locations to communicate and share information with each other via audio-visual technology, computers, and network communications such as the internet. Presentations, documents, murals, spreadsheets, boards, images, videos, and demonstrations have been used in virtual meetings. The present embodiments help improve virtual meeting software and, hence, the virtual meetings themselves by allowing crisper information to be delivered and to better capture and engage the attention of those individuals who are watching and/or listening at end devices. The present embodiments will help leaders or presenters for virtual meetings to augment their meetings and to more easily execute enhanced meeting content that will be presented to the meeting participants in a digital manner that better keeps viewer attention. The present embodiments will help the presenters to be able to present engaging content and not just static or illegible content and to make this presentation in a simplified manner. The present embodiments may also facilitate usage of virtual meetings that are repeated on a scheduled basis by avoiding ephemeral set up of presenter and receiver preferences. Thus, the present embodiments may improve the library of virtual meeting software.

Figure 1A:
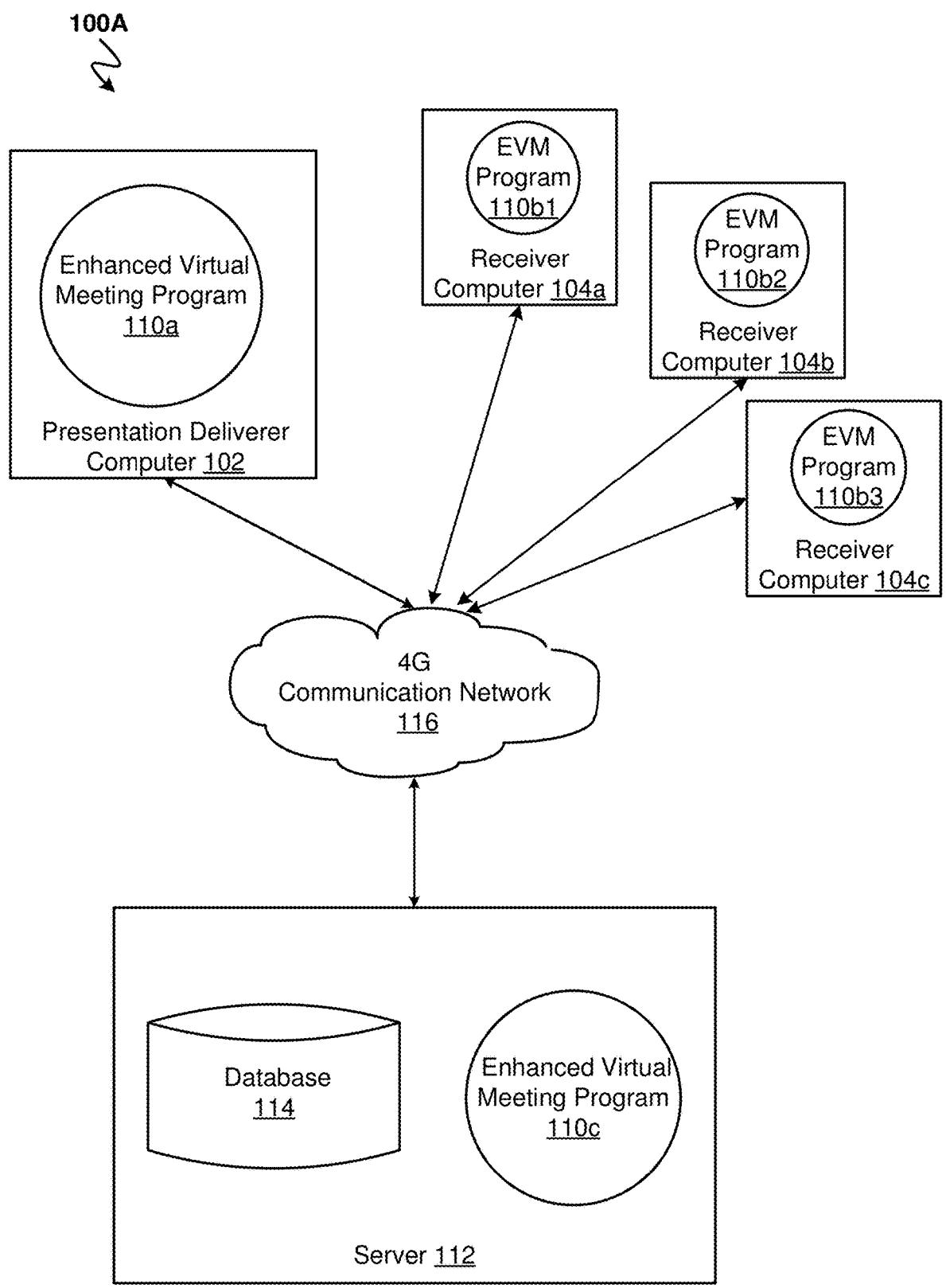
FIG. 1A illustrates a first networked computer environment according to at least one embodiment.

Referring to FIG. 1, a first networked computer environment 100A in accordance with one embodiment is depicted. The first networked computer environment 100A may include a presentation deliverer computer 102 and first, second, and third receiver computers 104a, 104b, and 104c, respectively, that are each enabled to run an enhanced virtual meeting program 110a, 110b1, 110b2, and 110b3, respectively. The first networked computer environment 100A may also include a server 112 that is a computer and that is enabled to run an enhanced virtual meeting program 110c that may interact with a database 114. The various computers, e.g., the presentation deliverer computer 102, the first, second, and third receiver computers 104a, 104b, and 104c, and the server 112 may communicate with each other via a 4G communication network 116. The first networked computer environment 100A may include many computers and many servers, although four computers and one server 112 are shown in FIG. 1. The 4G communication network 116 allowing communication between the presentation deliverer computer 102, the first, second, and third receiver computers 104a, 104b, and 104c, and the server 112 may include various types of communication networks, such as the Internet, a wide area network (WAN), a local area network (LAN), a telecommunication network, a wireless network, a public switched telephone network (PTSN) and/or a satellite network. It should be appreciated that FIG. 1A provides only an illustration of one implementation and does not imply any limitations with regard to the environments in which different embodiments may be implemented. Many modifications to the depicted environments may be made based on design and implementation requirements.

Figure 5:
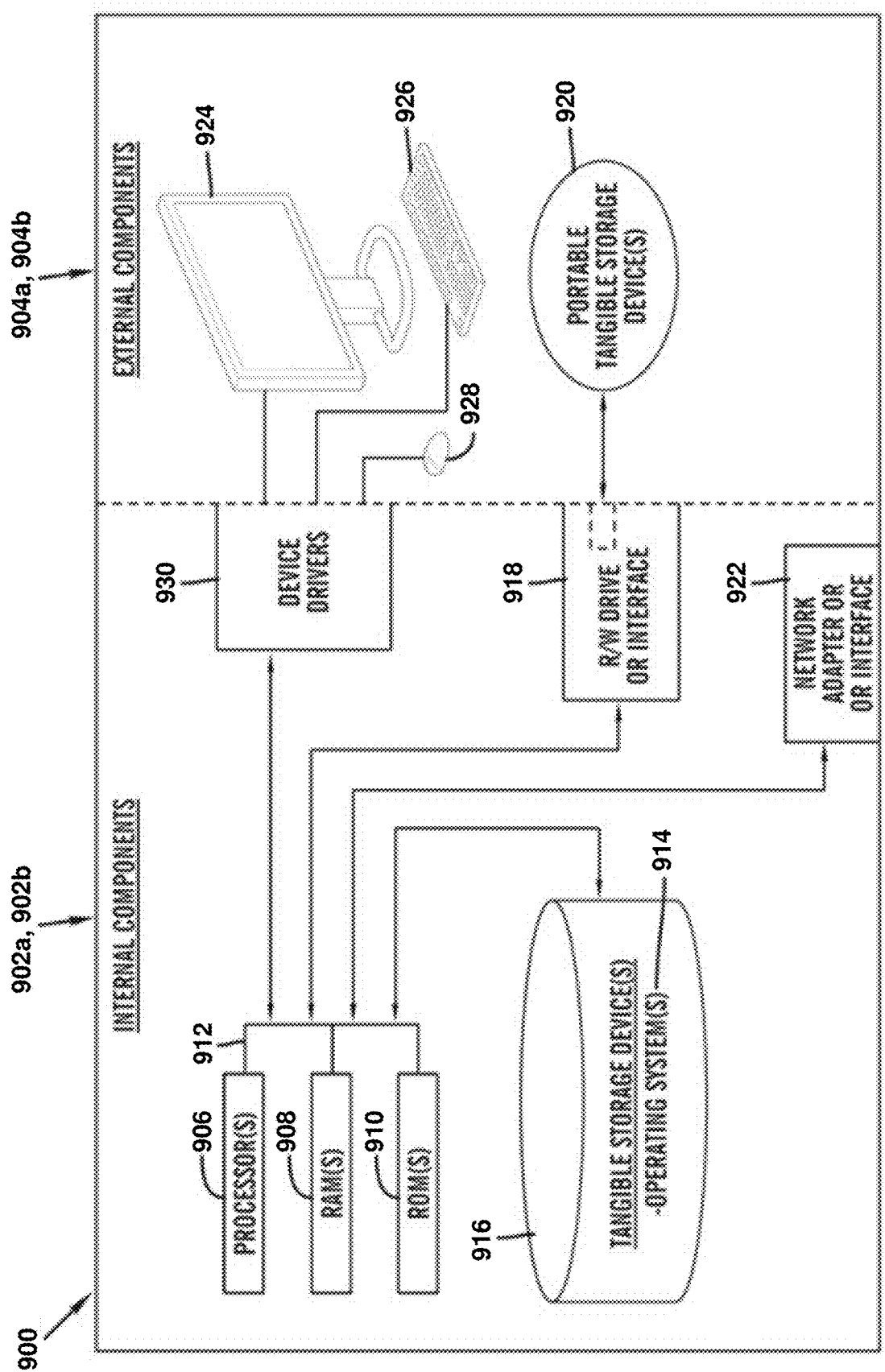
FIG. 5 is a block diagram of internal and external components of computers, phones, and servers depicted in FIG. 1 according to at least one embodiment.

The presentation deliverer computer 102 may communicate with the server 112 and with the first, second, and third receiver computers 104a, 104b, and 104c via the 4G communication network 116. The 4G communication network 116 may include connections, such as wire, wireless communication links, or fiber optic cables. As will be discussed with reference to FIG. 5, the server 112 may include internal components 902a and external components 904a, respectively. The presentation deliverer computer 102 and the first, second, and third receiver computers 104a, 104b, and 104c may also each include internal components 902b and external components 904b as depicted in FIG. 5. Server 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. The presentation deliverer computer 102 and the first, second, and third receiver computers 104a, 104b, and 104c may each be, for example, a mobile device, a telephone, a personal digital assistant, a netbook, a laptop computer, a tablet computer, a desktop computer, or any type of computing devices capable of running a program, accessing a network, and accessing a database 114 in a server 112 that is remotely located with respect to the presentation deliverer computer 102 and with respect to the first, second, and third receiver computers 104a, 104b, and 104c. The presentation deliverer computer 102 and the first, second, and third receiver computers 104a, 104b, and 104c may each include a display screen, a speaker, a microphone, a camera, and a keyboard or other input device for better presenting audio-visual material used in virtual meetings, for recording audio-visual material to transmit to others who are participating in a virtual meeting, and to provide feedback to presentations. According to various implementations of the present embodiment, the enhanced virtual meeting program 110a, 110b1, 110b2, 110b3, 110c may interact with a database 114 that may be embedded in various storage devices, such as, but not limited to a various computers/mobile devices, a server 112 that may be in a network, or a cloud storage service.

Figure 1B:
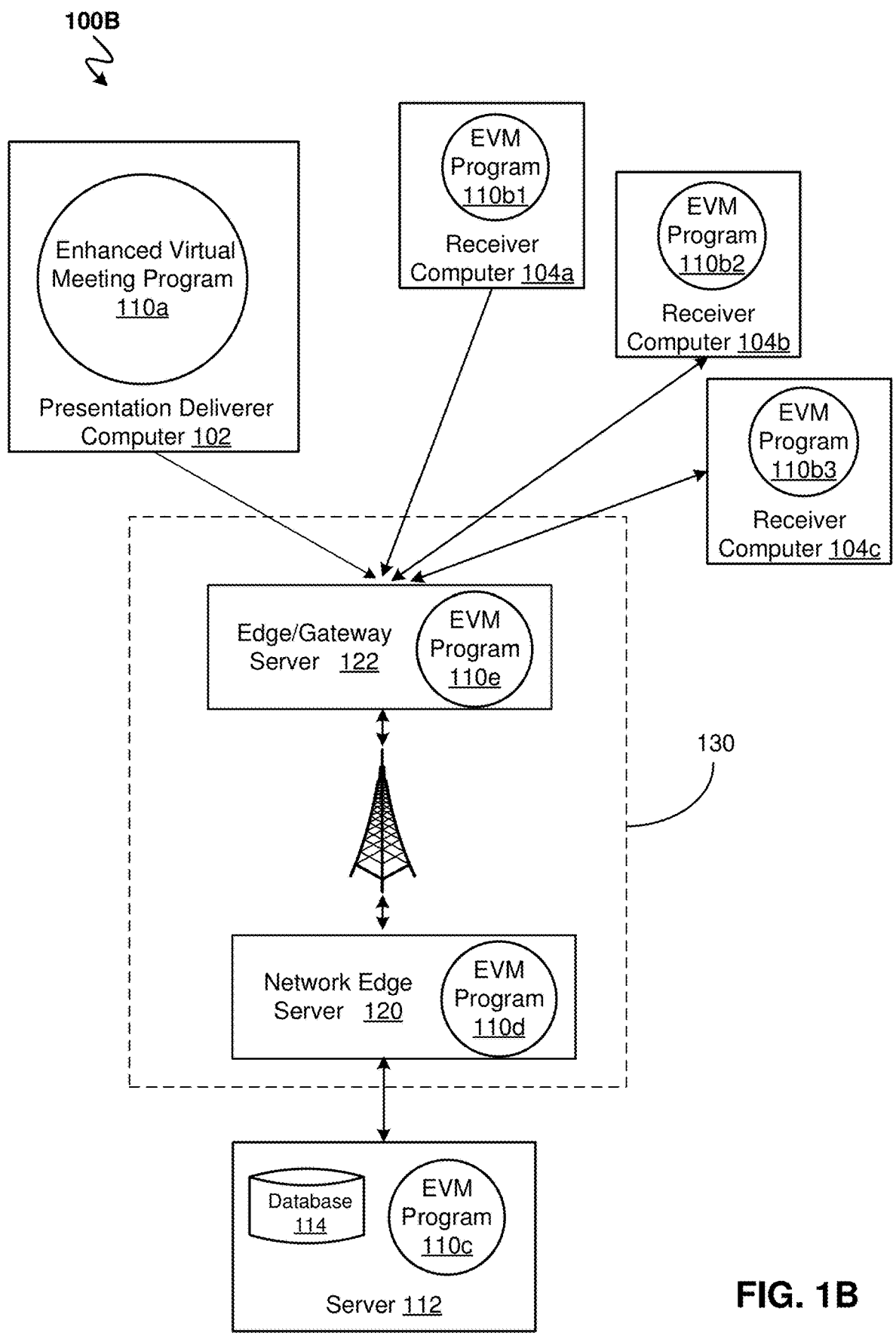
FIG. 1B illustrates a second networked computer environment according to at least one embodiment.

Referring to FIG. 1B, a second networked computer environment 100B in accordance with one embodiment is depicted. As depicted in FIG. 1B, the presentation deliverer computer 102, the first, second, and third receiver computers 104a, 104b, and 104c, respectively, and the server 112 that are each enabled to run an enhanced virtual meeting program 110a, 110b1, 110b2, 110b3, and 110c, respectively, are also able to operate in the second networked computer environment 100B. In contrast to the 4G communication network 116 in the first networked computer environment 100A that is shown in FIG. 1A, the second networked computer environment 100B includes a 5G communication network 130 to facilitate communication between multiple computer devices. The 5G communication network 130 may itself include multiple servers such as the network edge server 120 and the edge/gateway server 122. The network edge server 120 and the edge/gateway server 122 may be enabled to run enhanced virtual meeting programs 110d and 110e, respectively. The 5G communication network 130 allowing communication between the computer devices shown may itself include various types of communication networks, such as the Internet, a wide area network (WAN), a local area network (LAN), a telecommunication network, a wireless network, a public switched telephone network (PTSN) and/or a satellite network. It should be appreciated that FIG. 1B provides only an illustration of one implementation and does not imply any limitations with regard to the environments in which different embodiments may be implemented. Many modifications to the depicted environments may be made based on design and implementation requirements.

The presentation deliverer computer 102 may communicate with the server 112 and with the first, second, and third receiver computers 104a, 104b, and 104c via the 5G communication network 130. The 5G communication network 130 may include connections, such as wire, wireless communication links, or fiber optic cables. As will be discussed with reference to FIG. 5, the network edge server 120 and the edge/gateway server 122 may include internal components 902a and external components 904a, respectively. According to various implementations of the present embodiment, the enhanced virtual meeting program 110a, 110b1, 110b2, 110b3, 110c, 110d, 110e may interact with the database 114 that may be embedded in various storage devices, such as, but not limited to a various computers/mobile devices, the server 112, the edge/gateway server 122, the network edge server, or a cloud storage service.

The described embodiments for virtual meeting enhancement may operate in high speed networks such as 4G and 5G networks. Implementing the present virtual meeting enhancement embodiments in a 5G network will enable artificial intelligence capabilities to be implemented and to be implemented on the edge in order to boost network performance.

In at least some embodiments, artificial intelligence (AI) capabilities on the edge may be harnessed by processing data on local hardware of the devices involved. This usage of AI on the edge may enhance the described embodiments to accelerate improvement of the virtual meetings. Usage of storing content on edge servers may reduce network traffic that is required for execution of a virtual meeting that includes the enhanced content described herein. This reduction in network traffic may help achieve efficient processing for execution of the methods according to the present embodiments. As a content deliverer may log into a virtual meeting at the presentation deliverer computer 102 and as individuals receiving the content log into the virtual meeting at first, second, and third receiver computers 104a, 104b, and 104c, respectively, the deliverer and the receiver individuals utilize their network infrastructure to gain appropriate connectivity into the environment. The 5G connectivity has potential for becoming the predominant mobile platform for connecting devices such as desktops, electronic tablets, cell phones. The present embodiments may take advantage of existing and future 5G infrastructure and its increase of bandwidth, latency, and scaling of applications requiring large amounts of real-time data.

In at least some embodiments, the enhanced virtual meeting program 110e and its corresponding processing for enhanced experience may occur at the edge server/gateway 122 as depicted in FIG. 1B. The enhanced virtual meeting program 110e at the edge server/gateway 122 may include the ability to store virtual meeting preferences for content receivers as well as the ability to perform some of the user experience transformation in support of providing a unique experience to each user. Such a unique experience may include providing zooming, color preferences, and font style and size changes that are unique to a particular individual who is watching and/or listening to a presentation. Harnessing this network edge modularity capability may improve processing times and speeds when the enhanced virtual meeting program 110a, 110b1, 110b2, 110b3, 110c, 110d, 110e operates.

In at least some embodiments, normal data and enhanced experience capability may be processed on the server 112 which may be a virtual meeting tool server. The server 112 may trigger data and command flows to be processed by distributed enhanced experience capability that is available at the network edge server 120 located at the network edge and at the edge/gateway server 122 located at the network gateway. Summarization of preferences and usage data can flow from the edge gateway/server 122 through the network edge server 120 for access by the server 112 which implements enhanced experience capability in the virtual meeting tool.

A computer system with the enhanced virtual meeting program 110a, 110b1, 110b2, 110b3, 110c, 110d, 110e operates as a special purpose computer system in which the enhanced virtual meeting preparation process 200 assists in having an enhanced virtual meeting to be prepared and presented. In particular, the enhanced virtual meeting program 110a, 110b1, 110b2, 110b3, 110c, 110d, 110e transforms a computer system into a special purpose computer system as compared to currently available general computer systems that do not have the enhanced virtual meeting program 110a, 110b1, 110b2, 110b3, 110c, 110d, 110e.

Figure 2:
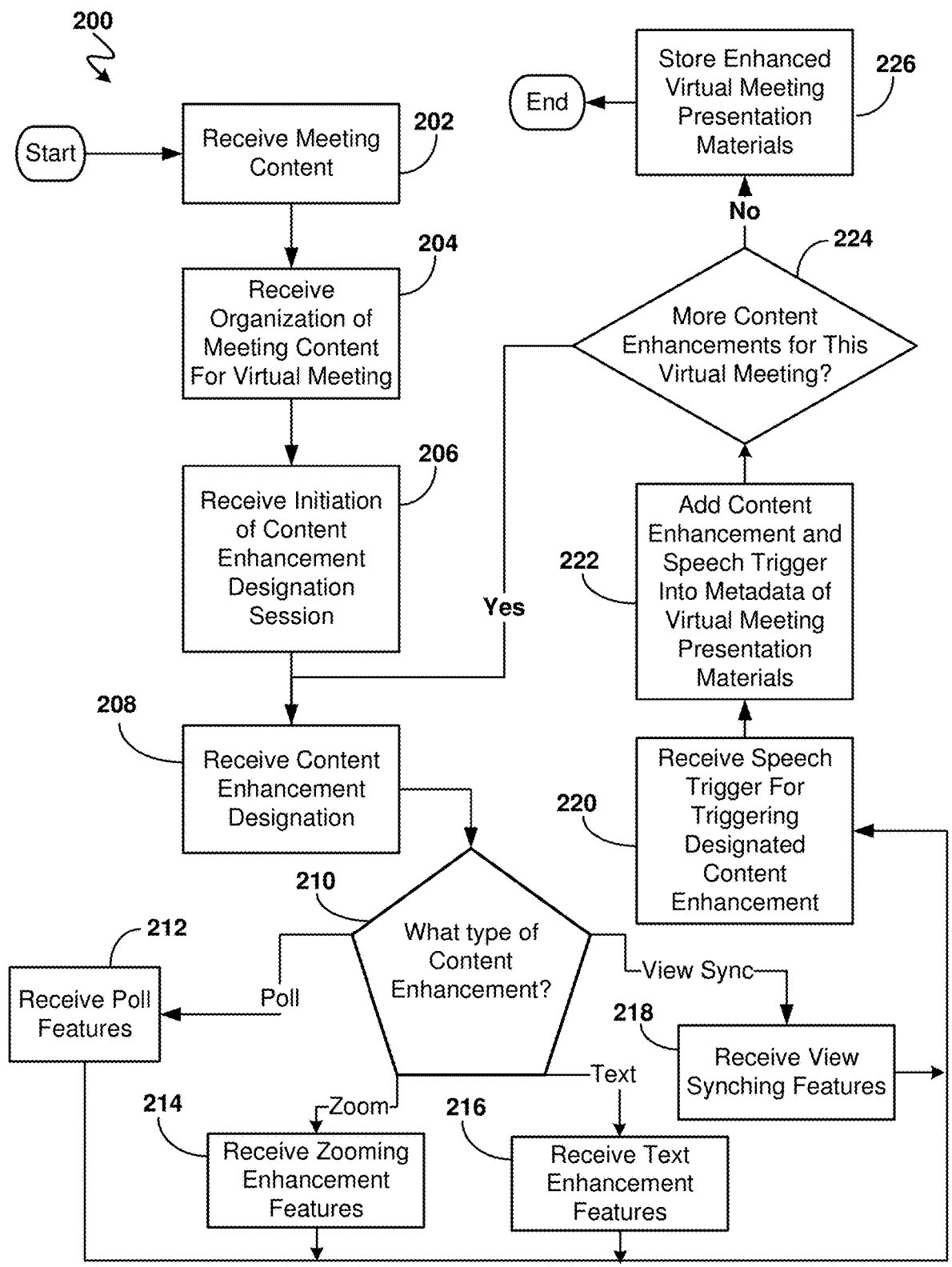
FIG. 2 is an operational flowchart illustrating an enhanced virtual meeting preparation process according to at least one embodiment.

Referring now to FIG. 2, an operational flowchart depicts an enhanced virtual meeting preparation process 200 that may, according to at least one embodiment, be performed using the enhanced virtual meeting program 110a, 110c, 110d, 110e. The person who will present, host, or speak at the upcoming virtual meeting or an assistant to this person may use the enhanced virtual meeting program 110a, 110c, 110d, 110e to prepare the virtual meeting materials that will be presented to meeting viewers during the virtual meeting. The enhanced virtual meeting program 110a, 110c, 110d, 110e may include various modules, user interfaces, services, and virtual meeting tools and may use data storage when the enhanced virtual meeting preparation process 200 is performed. The enhanced virtual meeting preparation process 200 may allow a preparer to in advance generate and save virtual meeting content enhancements and then use these saved enhancements during a subsequently presented virtual meeting to emphasize key points and to perform dynamic audiovisual content enhancement. The preparers may enter and save the enhancements using an application programming interface (API) or a plug-in at a virtual meeting tool at their location for the enhanced virtual meeting program 110a, 110c, 110d, 110e.

In a step 202 of the enhanced virtual meeting preparation process 200, meeting content is received. The meeting content may be received by receiving one or more digital files, whereby the receiving of the one or more digital files may occur via the 4G communication network 116 that is shown in FIG. 1A or via the 5G communication network 130 that was shown in FIG. 1B. The receiving may occur via the enhanced virtual meeting program 110a receiving one or more uploaded files at the presentation deliverer computer 102, via the enhanced virtual meeting program 110c at the server 112 receiving one or more digital files via the 4G communication network 116 or via the 5G communication network 130, via the enhanced virtual meeting program 110d at the edge/gateway server 122 receiving one or more digital files via the 5G communication network 130, or via the network edge server 120 receiving one or more digital files via the 5G communication network 130. These transmissions through the 4G communication network 116 or via the 5G communication network 130 may in some embodiments occur from the presentation deliverer computer 102 to the enhanced virtual meeting program 110c, 110d, 110e.

In at least some embodiments, the data received for step 202 may be obtained with application programming interface (API) access to web systems that have gathered some or all of this data. For example, in at least some embodiments, step 202 may be performed by the enhanced virtual meeting program 110a, 110b1, 110b2, 110b3, 110c, 110d, 110e using API access via the 4G communication network 116 or the 5G communication network 130 with a company or organizational website or platform which hosts digital files which may be used in virtual meetings.

The one or more digital files which may include meeting content may include word processing documents, murals, pictures, videos, audio recordings, spreadsheets, images, project management and team collaboration tool documents/boards, slides, frames, etc. The one or more digital files may include various components of an audio, visual, or audiovisual nature which may be transmitted during a virtual meeting to provide information to virtual meeting attendees. The various components may help provide crisp information that will interest virtual meeting attendees/participants and may be easily viewed and in some embodiments reviewed by the content receivers.

The meeting content that is received may be stored in memory that is part of the enhanced virtual meeting program 110a, 110c, 110d, 110e or that is accessible to the enhanced virtual meeting program 110a, 110c, 110d, 110e. For example, meeting content may be saved in the database 114 shown in FIGS. 1A and 1B, in the RAM 908 that is shown in FIG. 5, in memory of the edge/gateway server 122 shown in FIG. 1B, in memory of the network edge server 120 shown in FIG. 1A, and/or in other memory in one or more remote servers that is accessible to the enhanced virtual meeting program 110a, 110c, 110d, 110e via the 4G communication network 116, via the 5G communication network 130, and/or via a wired connection.

In a step 204 of the enhanced virtual meeting preparation process 200, organization of the meeting content for the virtual meeting is received. This step 204 may be performed by an individual, e.g., the presenter, an assistant to the presenter, or a leader of the presenter, using the enhanced virtual meeting program 110a, 110c, 110d, 110e to manage, edit, combine, modify, rearrange, etc. the meeting content that was received in step 202. For performing step 204, the enhanced virtual meeting program 110a, 110c, 110d, 110e may include content editing capabilities, e.g., that allow an individual to manage, edit, combine, modify, and rearrange meeting content material, e.g., audiovisual material.

The modified virtual meeting materials may be stored in memory that is part of the enhanced virtual meeting program 110a, 110c, 110d, 110e or that is accessible to the enhanced virtual meeting program 110a, 110c, 110d, 110e. For example, modified meeting content may be saved in the database 114 shown in FIGS. 1A and 1B, in the RAM 908 that is shown in FIG. 5, in memory of the edge/gateway server 122 shown in FIG. 1B, in memory of the network edge server 120 shown in FIG. 1A, and/or in other memory in one or more remote servers that is accessible to the enhanced virtual meeting program 110a, 110c, 110d, 110e via the 4G communication network 116, via the 5G communication network 130, and/or via a wired connection.

In a step 206 of the enhanced virtual meeting preparation process 200, initiation of a content enhancement designation session is received. The enhanced virtual meeting program

110*a*, 110*c*, 110*d*, 110*e* may generate a graphical user interface (GUI) component which may act as a content enhancement designation session initiator and whose activation may initiate a content enhancement designation session. An individual such as the presenter may use a keyboard 926, computer mouse 928, a microphone connected to the computer, a touch screen, or some other input device connected to the computer, e.g., to the presentation deliverer computer 102, to activate the session-initiating GUI component. The enhanced virtual meeting program 110*a*, 110*c*, 110*d*, 110*e* may display the session-initiating GUI components on the display screen 924 or on a screen of the presentation deliverer computer 102. The initiation of this session-initiating GUI component may trigger the generation of other program features such as other GUIs which ask a user to enter a type of content enhancement and a location in the presentation materials for a content enhancement. These other GUI features may include scrollable lists, swipable graphics, taskbars, timer bars, sequential slide or frame displays, etc. that are displayed on the display screen 924 or on the screen of the presentation deliverer computer 102.

In a step 208 of the enhanced virtual meeting preparation process 200, a content enhancement designation is received. This content enhancement designation may originate by an individual such as the presenter using a keyboard 926, computer mouse 928, a microphone connected to the computer, a touch screen, or some other input device connected to the computer, e.g., to the presentation deliverer computer 102, to interact with one or more GUI features to designate a content enhancement. The user may actuate one or more of scrollable lists, swipable graphics, taskbars, timer bars, sequential slide or frame displays, etc., that are being displayed on the display screen, to indicate an intention to the enhanced virtual meeting program 110*a*, 110*c*, 110*d*, 110*e* that content enhancement is to be added to the virtual meeting materials, e.g., to the materials that were received in step 202 and that were organized in step 204.

The designation may include a type of content enhancement that is to be added and may include a location within the virtual meeting materials for adding the specified content enhancement. The content enhancement may be referred to as a target element.

In a step 210 of the enhanced virtual meeting preparation process 200, a determination is made as to what type of content enhancement was designated in step 208. This determination may be made by the enhanced virtual meeting program 110*a*, 110*c*, 110*d*, 110*e* interpreting the user actuation that was performed in step 208. The enhanced virtual meeting program 110*a*, 110*c*, 110*d*, 110*e* may perform step 210 by interpreting which entry in a scrollable list was actuated. If the determination indicates that a poll enhancement was designated, the enhanced virtual meeting preparation process 200 proceeds to step 212. If the determination indicates that a zooming enhancement was designated, the enhanced virtual meeting preparation process 200 proceeds to step 214. If the determination indicates that a text enhancement was designated, the enhanced virtual meeting preparation process 200 proceeds to step 216. If the determination indicates that a view synching enhancement was designated, the enhanced virtual meeting preparation process 200 proceeds to step 218.

In a step 212 of the enhanced virtual meeting preparation process 200, poll features are received. Providing a poll during a virtual meeting is one way a presenter may interact with the virtual meeting audience during the virtual meeting. These poll features may include a poll question to be presented as part of a poll for the virtual meeting. These poll features may include an answer response type that is sought to be obtained via the poll, e.g., whether the poll provides a multiple choice question or an open response answer in essay form that allows sentences or words to be freely chosen and provided by the virtual meeting viewer. These poll features may include multiple choice responses that could be selected by viewers of the virtual meeting. These poll features may include font choices and/or font sizes for the words that will be displayed in the poll. These poll features may include timing features, such as the length of time the viewer will be given to deliberate and answer the poll before the presentation moves on to the next segment. This length of time may include a duration for how long the poll question and poll answers may be displayed. These poll features may include border graphics or formatting elements for how the poll will appear to viewers of the virtual meeting.

The poll may ask a poll question "What is the most common error on the assembly of this part?" and may provide the following three multiple choice answers "a) Unplugged cable; b) Missing part, c) User error". When the poll is intended to be a quiz or test to test the knowledge of the meeting participants about a subject, the poll features that are received may include a correct answer that will be displayed after the polling question is provided and after results are received, tabulated, and displayed in the virtual meeting by the enhanced virtual meeting program 110*a*, 110*c*, 110*d*, 110*e*. As a polling feature in another embodiment, a list of free form viewer responses to the polling question may be displayed for a limited time during the virtual meeting.

The enhanced virtual meeting program 110*a*, 110*c*, 110*d*, 110*e* may include a chat function. During the virtual meeting that will take place with the presenter presenting at the presentation deliverer computer 102 and with viewers watching respectively at first, second, and third receiver computers 104*a*, 104*b*, and 104*c*, one or more poll questions may be presented via the chat function and poll answers may be received via the chat function.

An example of the polling enhancement features received in step 212 may occur with polling instructions being provided in a form of metadata. For example, the virtual meeting content preparer may give the following polling information:

<Polling keyword=Poll, duration=10 seconds>

What is the most common error on the assembly of this part?

a) Unplugged cable b) Missing part c) User error

</Polling>

Receiving the polling features in step 212 may include receiving a location within the virtual meeting presentation materials where the poll is to be provided during the presentation of the virtual meeting. For example, an instruction may be given to present the poll between two slides or frames of the virtual meeting content materials.

When a polling determination is made in step 210, the enhanced virtual meeting program 110*a*, 110*c*, 110*d*, 110*e* may generate one or more polling GUIs to display on the display screen 924 in order to receive polling instructions from the virtual meeting content preparing individual or individuals during the enhanced virtual meeting preparation process 200.

In a step 214 of the enhanced virtual meeting preparation process 200, zooming enhancement features are received.

The zooming enhancement may relate to a visual feature that is to be presented during the virtual meeting. For example, the zooming enhancement may relate to text to be displayed during the virtual meeting or to an image to be displayed during the virtual meeting. The zooming enhancement may include a zooming in or a zooming out step compared to the viewpoint that is displayed during the virtual meeting before the zooming step. The zooming enhancement may occur during the meeting in a pair of actions, for example, a zoom in that is followed subsequently by a zoom out to return the view to the original view.

The zooming enhancement may require the screens of the presentation deliverer computer 102 as well as the screens of the first, second, and third receiver computers 104a, 104b, 104c to display the same viewpoint and view size during the time in the virtual meeting when this respective zooming enhancement is designated to take place. Such a general zooming may be indicated with a "type=all" command that is provided during the enhanced virtual meeting preparation process 200. This type=all zooming may be concluded during the actual virtual meeting by the content presenter taking a zooming finishing action at the presentation deliverer computer 102. For example, if the presenter first zooms in during this type=all zooming segment, the presenter may then end this zooming segment by zooming out back to the original view which may trigger a zoom out for all receiver computers participating in the virtual meeting.

The zooming enhancement may also be provided on an optional basis so that virtual meeting recipients have the option to zoom in for a closer view or zoom out for a wider view of materials. With this optional zooming, the presenter during the virtual meeting may maintain a normal view and content receivers may have the zooming option. Such a general zooming may be indicated with a "type=receiver zooming" command that is provided during the enhanced virtual meeting preparation process 200. This receiver optional zooming may be concluded during the actual virtual meeting by the receiver taking a zooming finishing action at the first, second, or third receiver computer 104a, 104b, 104c, respectively. For example, if the virtual meeting viewer first zooms in during this "type=receiver zooming" segment, the virtual meeting viewer may then end this zooming segment by zooming out back to the original view. The viewer optional feature may allow a user who struggles with processing views of a certain size to alter their view and, thus, better see and appreciate the virtual meeting materials. This viewer optional feature, thus, may help better serve those meeting participants with special needs such as eyesight or hearing related needs.

Zooming sizes for a virtual meeting zooming segment may include zoom, zoom-plus, and normal sizes.

An example of the zooming enhancement features received in step 214 may occur with zooming instructions being provided in a form of metadata. For example, the virtual meeting content preparer may give the following zooming information:

<KeyArea keyword=image, type=all, size=zoomplus>
</KeyArea>

Receiving the zooming features in step 212 may include receiving a location within the virtual meeting presentation materials where the zooming is to occur or is to be available during the presentation of the virtual meeting. For example, an instruction may be given to present the zooming action on a certain slide or frame of the meeting materials. A user may indicate which portion of a slide, image on a slide, or frame on which the zooming is to occur or be available during the virtual meeting. The enhanced virtual meeting program 110a, 110c, 110d, 110e may ask the content preparer to place a marker over the content meeting materials to indicate the location during the enhanced virtual meeting preparation process 200. During the virtual meeting, the enhanced virtual meeting program 110a, 110c, 110d, 110e may display the zooming marker at the specified time or location and may require the presenter to point and click, e.g., by using the computer mouse 928, on the marker to trigger the zooming. The enhanced virtual meeting program 110a, 110c, 110d, 110e may save as a trigger function a keyword alone or the keyword being spoken in conjunction with the presenter pointing and clicking on the zooming marker with an input device such as the computer mouse 928.

When a zooming determination is made in step 210, the enhanced virtual meeting program 110a, 110c, 110d, 110e may generate zooming GUIs to display on the display screen 924 in order to receive zooming instructions from the virtual meeting content preparing individual or individuals during the enhanced virtual meeting preparation process 200.

In a step 216 of the enhanced virtual meeting preparation process 200, text enhancement features are received. These text enhancement features may include which portion of text is to receive the enhancement, a size enhancement that selected text should receive, and color changes that selected text, text border areas, or text backgrounds areas should receive. When a text enhancement determination is made in step 210, the enhanced virtual meeting program 110a, 110c, 110d, 110e may generate text highlighting GUIs to receive text highlighting instructions from the virtual meeting content preparing individual or individuals during the enhanced virtual meeting preparation process 200.

An example of the text enhancement features received in step 216 may occur with text enhancement instructions being provided in a form of metadata. For example, the virtual meeting content preparer may give the following text enhancement information:

<KeyPoint keyword=assembly, type=highlight, duration=5>
</KeyPoint>

These metadata instructions may indicate that the text enhancement will display for 5 seconds upon initiation. The tag may be placed by the preparer within words of the text of the document, and all text between the beginning and end of the tag may receive the text enhancement, in this case a highlighting. The metadata instruction may indicate a trigger for the text enhancement. The trigger designation means that when the content presenter says "assembly" during the presentation, the enhanced virtual meeting program 110a, 110c, 110d, 110e is configured to recognize this word and to match the spoken word with the keyword saved in the metadata. Upon a matching, the enhanced virtual meeting program 110a, 110c, 110d, 110e generates the specified text enhancement feature and displays the generated text enhancement feature to the content materials that are being transmitted to virtual meeting recipients, e.g., to users at the first, second, and third receiver computers 104a, 104b, 104c.

Receiving the text enhancement features in step 216 may include receiving a location within the virtual meeting presentation materials where the text enhancement is to be provided during the presentation of the virtual meeting. For example, an instruction may be given to present the text enhancement on a particular slide or frame of the meeting materials.

In a step 218 of the enhanced virtual meeting preparation process 200, view synching features are received. These features may include a meeting content location at which segments during the virtual meeting the presenter wishes all participants and viewers to be focused on the same point, idea, concept, or portion of meeting content. When a view synching determination is made in step 210, the enhanced virtual meeting program 110a, 110c, 110d, 110e may generate view synching GUIs to receive view synching instructions from the virtual meeting content preparing individual or individuals during the enhanced virtual meeting presentation process 200. The enhanced virtual meeting program 110a, 110c, 110d, 110e may display these view synching GUIs on the display screen 924 or on a screen of the presentation deliverer computer 102 to facilitate receiving view synching instructions from the meeting content preparer or preparers.

An example of the view synching features received in step 218 may occur with view synching instructions being provided in a form of metadata. For example, the virtual meeting content preparer may give the following view synching information:

<Viewsync keyword=main view>
</KeyPoint>

These metadata instructions may indicate that when the word "main view" is spoken by the presenter during the virtual meeting, the enhanced virtual meeting program 110a, 110c, 110d, 110e ensures display signals for all display screens of the computers associated with content deliverers and with content receivers, e.g., all of the presentation deliverer computer 102 and the first, second, and third receiver computers 104a, 104b, and 104c, are the same. Thus, the various virtual meeting participants may see the same view of virtual meeting materials.

Receiving the view synching features in step 218 may include receiving a location within the virtual meeting presentation materials where the view synching is to be provided during the presentation of the virtual meeting. For example, an instruction may be given to execute the view synching on a particular slide or frame of the meeting materials. The view synching features in step 218 may also be given without any association to virtual meeting segment information, so that if the enhanced virtual meeting program 110a, 110c, 110d, 110e recognizes that the presenter speaks the view synching keyword at any time during the presentation, all display signals for the various computer screens are synched for each time the spoken keyword is recognized.

In a step 220 of the enhanced virtual meeting preparation process 200, a speech trigger for the designated content enhancement is received. The speech trigger may be received in a reception separate from the content enhancement information received in steps 212, 214, 216, and/or 218 or may be received in the same reception in which the content enhancement information is received in steps 212, 214, 216, and/or 218. The speech trigger that is received may be machine-encoded text or may be converted into machine-encoded text that the enhanced virtual meeting program 110a, 110c, 110d, 110e saves for use during the virtual meeting presentation. This machine-encoded text may be referred to as first machine-encoded text. During the virtual meeting presentation, for example as will be described with respect to FIG. 3, the presenter may speak, the voice and audio of the presenter may be recorded, speech-to-text may be performed on the recorded speech to convert the audio files into machine-encoded text which may be referred to as second machine-encoded text, and this second machine-encoded text may be compared to the trigger information, e.g., the first machine-encoded text, that was saved for the respective virtual meeting. When the machine-encoded text from this process matches with the saved trigger information, e.g., if the second machine-encoded text matches with the first machine-encoded text for the trigger, then the corresponding saved meeting content enhancement will be activated and performed for the audiovisual meeting content that is being presented via the broadcast stream of the virtual meeting.

The speech trigger may be received by the meeting content preparer responding to a GUI that is generated during the enhanced virtual meeting preparation process 200 after a content enhancement designation is received in step 208. The speech trigger may include a word, a group of words, or a particular sound. The content preparer may type these words into the speech trigger GUI or may speak these words into a microphone that are transcribed into machine-encoded text by speech-to-text functions of the enhanced virtual meeting program 110a, 110c, 110d, 110e. Receiving the speech trigger in step 220 may include receiving the speech trigger in audio form and/or in textual form. The enhanced meeting content preparer may speak the word, words or sounds constituting the speech trigger into a microphone connected to the computer, e.g., the presentation deliverer computer 102, that is being used during the enhanced virtual meeting preparation process 200. The audio recording captured here may be stored with or in the files of the enhanced virtual meeting content for accessing for comparison purposes during the actual virtual meeting. The one or more audio recordings received here may be referred to as preparation audio files. The enhanced meeting content preparer may also type the words or use an input device to textually enter the speech trigger into the computer for saving in the files of the enhanced virtual meeting content.

The enhanced virtual meeting program 110a, 110c, 110d, 110e may generate a list of previously used speech triggers for this presentation, so that in some embodiments the content preparer may be blocked from repeating the same speech trigger. If the content preparer attempts to enter a speech trigger that was already used for this virtual meeting, the enhanced virtual meeting program 110a, 110c, 110d, 110e may generate a block and/or a warning that encourages or forces the preparer to choose a different speech trigger for this enhancement.

For all content enhancements that are designated, the enhanced virtual meeting program 110a, 110c, 110d, 110e may display on the screen of the preparer, e.g., on the screen of the presentation deliverer computer 102, how the content enhancement will appear. The enhancement presentation at this point via this presentation may allow the preparer to test how the enhancement will appear. The preparer may accept the modification for saving in step 222 or the preparer may reject and try a different enhancement, so that initially introduced enhancement is discarded and not stored for use during the presentation. Such a discarded enhancement would not be saved in the virtual meeting presentation metadata in step 222.

In a step 222 of the enhanced virtual meeting preparation process 200, content enhancement and the speech trigger are added into metadata of the virtual meeting presentation materials. Examples of possible metadata formatting for the speech trigger were provided above with respect to the polling information received in step 212, the zooming information received in step 214, the text enhancement information received in step 216, and the view synching information received in step 218. The user may themselves input the speech trigger information in a metadata form. Alternatively, the enhanced virtual meeting program 110a, 110c, 110d, 110e may convert the received speech trigger information into the metadata form. The metadata may include tags in the programming code that describe the hierarchical structure and relationships among the discrete pieces of data.

In a step 224 of the enhanced virtual meeting preparation process 200, a determination is made as to whether more content enhancements for the respective virtual meeting are to be provided. The determination of step 224 may be performed by receiving a content preparer response to a GUI which asks if more content enhancements are to be entered for the respective virtual meeting. The content preparer or assistant may provide one or more content enhancements for each slide, frame, or screen view that will be shared during the virtual meeting. If a negative answer is determined in step 222 so that no more content enhancements are to be provided or entered, then the enhanced virtual meeting preparation process 200 proceeds to step 224. If an affirmative answer is determined in step 222 so that more content enhancements are to be entered or provided, then the enhanced virtual meeting preparation process 200 proceeds back to step 208 for repeating steps 208, 210, 212 or 214 or 216 or 218, and 220 and 222. This portion of the enhanced virtual meeting preparation process 200 may be a repeated loop that continually repeats iteratively until all content enhancement designations have been provided. These other steps may be repeated in iteration until all content enhancements have been entered, formatted, processed, and stored.

In a step 226 of the enhanced virtual meeting preparation process 200, enhanced virtual meeting presentation materials are stored. This saving may include the saving of the metadata that was generated in step 224, the content meeting materials received in step 202, the modified content meeting materials that were the outcome of step 204, and the content enhancements that were received in step 212, 214, 216, and/or 218. Priority storage would be provided to the modified content meeting materials generated in step 204 and with the metadata and stored meeting content enhancements as compared to the meeting content received in step 202, as the modified content meeting materials with triggers and corresponding enhancements include desired modifications that have better prepared the content for sharing during a virtual meeting.

The composite enhanced virtual meeting presentation materials may be stored as part of step 226 in memory that is part of the enhanced virtual meeting program 110a, 110c, 110d, 110e or that is accessible to the enhanced virtual meeting program 110a, 110c, 110d, 110e. For example, composite virtual meeting materials may be saved in the database 114 shown in FIGS. 1A and 1B, in the RAM 908 that is shown in FIG. 5, in memory of the edge/gateway server 122 shown in FIG. 1B, in memory of the network edge server 120 shown in FIG. 1A, and/or in other memory in one or more remote servers that is accessible to the enhanced virtual meeting program 110a, 110c, 110d, 110e via the 4G communication network 116, via the 5G communication network 130, and/or via a wired connection. Storing the enhanced content at memory of the edge/gateway server 122 may reduce network traffic that is required during the presentation of the virtual meeting.

After the storing of step 226, the enhanced virtual meeting preparation process 200 is ended and the saved virtual meeting content materials are ready for use during an actual virtual meeting, e.g., at a scheduled time in the future. The saved enhanced virtual meeting may then be accessed in the enhanced virtual meeting presentation process 300 that is described below and shown in FIG. 3.

Figure 3:
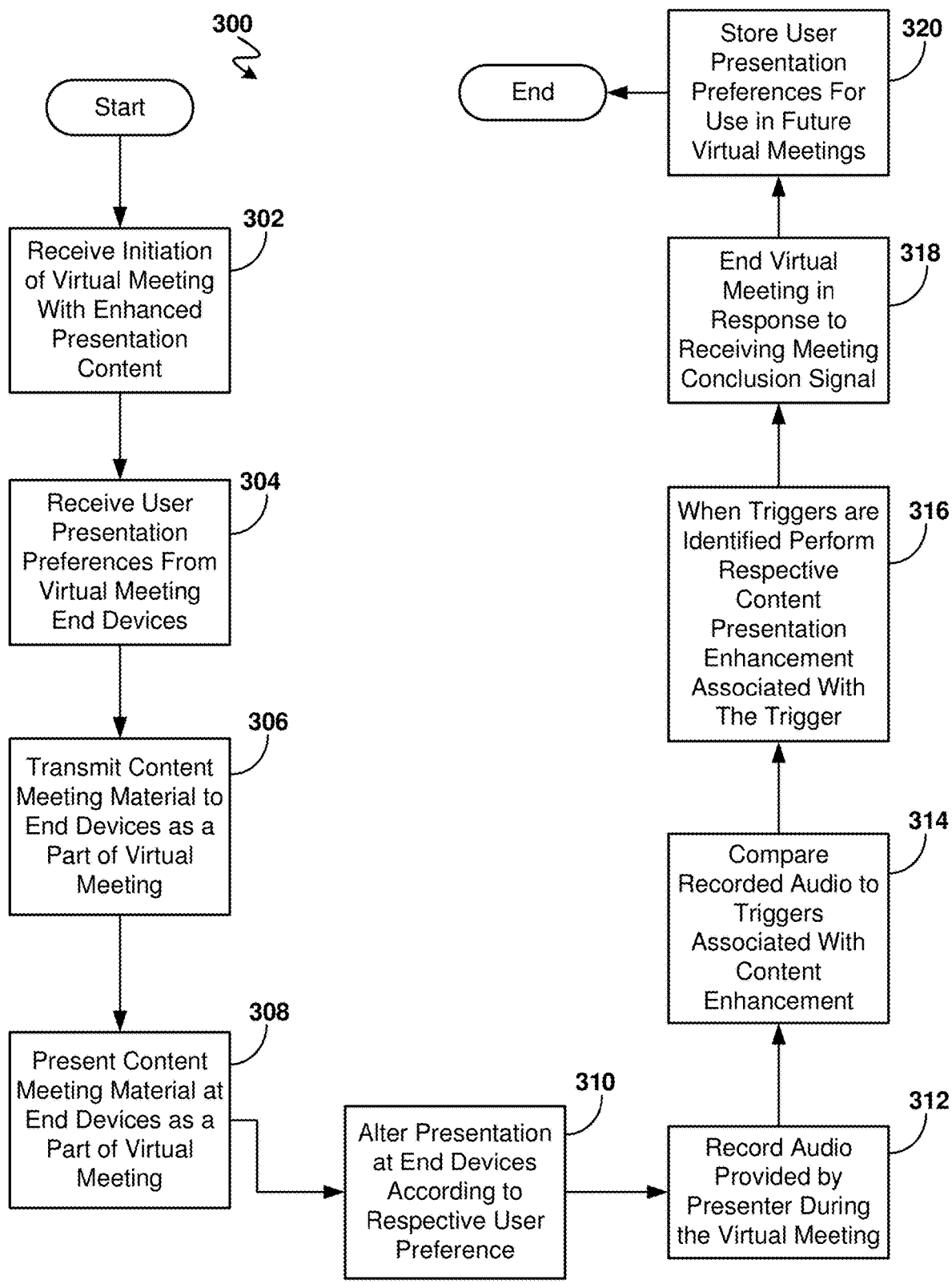
FIG. 3 is an operational flowchart illustrating an enhanced virtual meeting presentation process according to at least one embodiment.

In a step 302 of the enhanced virtual meeting presentation process 300, initiation of a virtual meeting with enhanced presentation content is received. The enhanced virtual meeting program 110a, 110c, 110d, 110e may generate an introduction graphical user interface (GUI) which asks whether the user would like to complete enhanced virtual meeting preparation, e.g., as is shown in FIG. 2, or to execute a virtual meeting with enhanced presentation content, e.g., as is shown in FIG. 3. Actuation by the user of the virtual meeting execution GUI component may occur via an individual such as the presenter using a keyboard 926, computer mouse 928, a microphone connected to the computer, a touch screen, or some other input device connected to the computer, e.g., to the presentation deliverer computer 102, to activate the virtual meeting execution GUI component. The enhanced virtual meeting program 110a, 110c, 110d, 110e may display the virtual meeting execution GUI component on the display screen 924 or on a screen of the presentation deliverer computer 102.

In a step 304 of the enhanced virtual meeting presentation process 300, user presentation preferences are received from virtual meeting end devices. These virtual meeting end devices may include the first, second, and third receiver computers 104a, 104b, and 104c, respectively, that are shown in FIGS. 1A and 1B. These user presentation preferences allow the individual virtual meeting viewers to customize some of the virtual meeting content formats so that the individual is better able to see or understand the virtual meeting contents. This modification of virtual meeting content according to unique viewer preferences may help better serve those meeting participants with special needs such as eyesight or hearing related needs. The user may be able to configure preferences for their preferred layout and features. The virtual meeting viewers at the end devices, e.g., at the first, second, and third receiver computers 104a, 104b, and 104c, may receive meeting material modifications according to their requested preferences. The user preferences may include a particular modified text color being used for the presentation.

Figure 4:
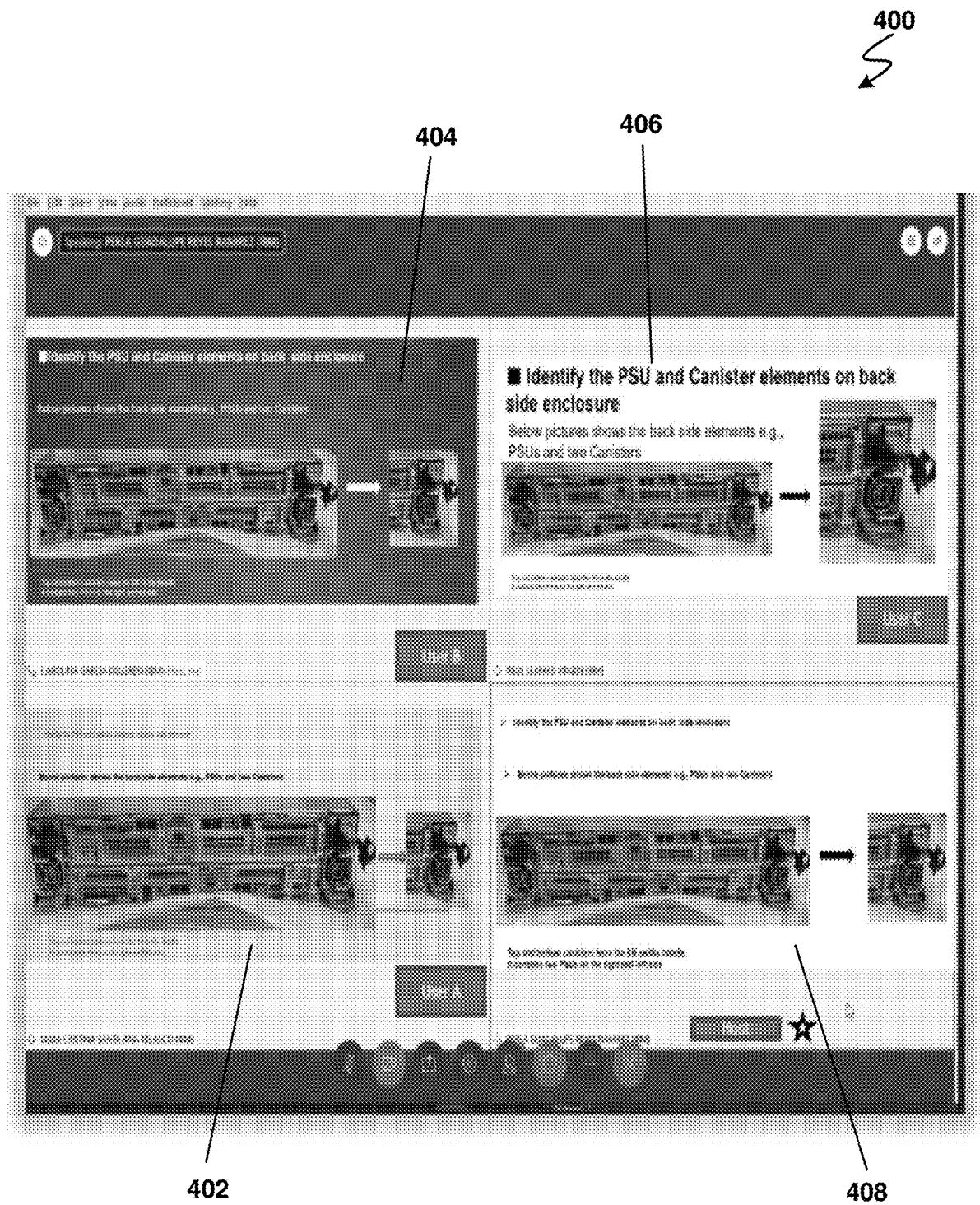
FIG. 4 is an example of multiple screenshots showing various views modified according to presentation preferences of virtual meeting viewers according to at least one embodiment.

For example, a first user, User A, may set presentation preferences for larger fonts, when the text will still fit within the screen, and for different background colors. A second user, User B, may set presentation preferences to change a background, a type of letters, and a size of letters. A third user, User C, may set their preferences for zoom-plus or an enlarged, view for all images. User A, User B, and User C may be viewing the virtual meeting at the first, second, and third receiver computers 104a, 104b, and 104c, respectively. FIG. 4 shows an example of these varied end device views 400 with first, second, and third views 402, 404, 406 of these screens for these users at their computers at the same time that the host is seeing a virtual meeting screen during the presentation. The host may see the host view 408 at the screen of the presentation deliverer computer 102. The varied end device views 400 show the different views that occur at the same time during the virtual meeting or at the same point within the virtual meeting. In the third view 406, the second image is larger indicating a zoomed-in view as compared to the second image that is visible in the host view 408 and in the first and second views 402, 404. Also in the third view 406, the headline text at the top of the view is shown with a larger font size as compared to the headline text font size that is visible in the host view 408 and in the first and second views 402, 404. In the second view 404, a different slide overall background color is visible as compared to the overall background color that is visible in the host view 408 and in the first and third views 402, 406. In the first view 402, the headline text at the top of the view may include a different font color as compared to the font colors that are used for the headline text in the host view 408 and in the second and third views 404, 406.

The user presentation preferences may also relate to a positioning for text on the screen. Some user may prefer to have text shown in a lower, higher, more leftward, or more rightward position on the display screen of the user or may prefer a combination of these position changes.

The enhanced virtual meeting program 110a, 110c, 110d, 110e may generate a viewer preference graphical user interface (GUI) which asks whether the end viewers would like to have the presentation format be modified. This viewer preference GUI may be generated by the enhanced virtual meeting program 110b1, 110b2, 110b3 at the display screens 924 of the first, second, and third receiver computers 104a, 104b, 104c, respectively. Actuation and preference selection by the end viewers may occur via the end viewers using a keyboard 926, computer mouse 928, a microphone connected to the computer, a touch screen, or some other input device connected to their computer, e.g., to the first, second, or third receiver computers 104a, 104b, 104c, to select user preferences. The user preferences that are available for modification may be presented to the user in one or more scrollable lists or swipable graphics that are displayed on the display screen 924 of the receiver computer. The user preference GUIs may also include text entry fields where the end viewer may type in a raw number for a font size, a word indicating the font type, a desired color for text or background or border, etc.

The obtaining of the user presentation preferences by the enhanced virtual meeting program 110a, 110c, 110d, 110e may occur before the virtual meeting begins or at the beginning of the virtual meeting. For preference acquisition that occurs before the beginning of the virtual meeting, the viewer preferences may be saved in a memory that is part of the enhanced virtual meeting program 110a, 110c, 110d, 110e or that is accessible to the enhanced virtual meeting program 110a, 110c, 110d, 110e. For example, end viewer presentation preferences may be saved in the database 114 shown in FIGS. 1A and 1B, in the RAM 908 that is shown in FIG. 5, in memory of the edge/gateway server 122 shown in FIG. 1B, in memory of the network edge server 120 shown in FIG. 1A, and/or in other memory in one or more remote servers that is accessible to the enhanced virtual meeting program 110a, 110c, 110d, 110e via the 4G communication network 116, via the 5G communication network 130, and/or via a wired connection. Storing the viewer preferences at memory of the edge/gateway server 122 may reduce network traffic that is required during the presentation of the virtual meeting.

In a step 306 of the enhanced virtual meeting presentation process 300, content meeting material is transmitted to end devices as a part of the virtual meeting. This transmission of step 306 may occur starting from the memory location in which the modified meeting content with content enhancement and triggers in metadata were stored in step 226 of the enhanced virtual meeting preparation process 200 shown in FIG. 2. The composite enhanced virtual meeting presentation materials may have been stored in memory that is part of the enhanced virtual meeting program 110a, 110c, 110d, 110e or that is accessible to the enhanced virtual meeting program 110a, 110c, 110d, 110e. For example, composite virtual meeting materials may have been saved in the database 114 shown in FIGS. 1A and 1B, in the RAM 908 that is shown in FIG. 5, in memory of the edge/gateway server 122 shown in FIG. 1B, in memory of the network edge server 120 shown in FIG. 1A, and/or in other memory in one or more remote servers that is accessible to the enhanced virtual meeting program 110a, 110c, 110d, 110e via the 4G communication network 116, via the 5G communication network 130, and/or via a wired connection. Storing the enhanced content at memory of the edge/gateway server 122 may reduce network traffic that is required during the presentation of the virtual meeting.

The transmission of step 306 may occur via the enhanced virtual meeting program 110a, 110c, 110d, 110e sending one or more digital files via the 4G communication network 116 or via the 5G communication network 130, with the one or more digital files being received by end devices for the virtual meeting, e.g., the first, second, and third receiver computers 104a, 104b, 104c, which may each be considered an audience receiver.

In a step 308 of the enhanced virtual meeting presentation process 300, content meeting material is presented at the end devices as part of the virtual meeting. This presentation in step 308 may occur for the meeting material that was transmitted in step 306. The presentation may occur at a display monitor of each audience receiver, e.g., at a display monitor 924 of each of the first, second, and third receiver computers 104a, 104b, 104c. A respective microphone connected to each audience receiver, e.g., to each of the first, second, and third receiver computers 104a, 104b, 104c may also assist in the presentation by playing audio files that are transmitted along with the digital files of the meeting content materials.

In some embodiments, the meeting content materials may be transmitted to the end devices before the virtual meeting begins. A live stream may include audio that is spoken live by the presenter at the presentation deliverer computer 102. In other embodiments, the meeting content materials are sent in segments to the audience receivers, e.g., to the first, second, and third receiver computers 104a, 104b, 104c as the virtual meeting presenter progresses through the presentation.

In a step 310 of the enhanced virtual meeting presentation process 300, presentation at the end devices is altered according to the respective user preference. The altering of the meeting material may occur in the server 112, in a network edge server 120, in the edge/gateway server 122, and/or in the respective receiver computer, e.g., in the first, second, or third receiver computer 104a, 104b, 104c. When the virtual meeting content is played, appropriate modifications and alterations to the meeting content may occur to produce different views for different meeting recipients, as is shown with the example of the varied end device views 400 shown in FIG. 4.

In a step 312 of the enhanced virtual meeting presentation process 300, audio provided by the presenter during the virtual meeting is recorded. This audio may be spoken from the mouth of the presenter and may be captured by a microphone that is connected to a computer, e.g., to the presentation deliverer computer 102. This audio that is recorded may be transmitted from the presentation deliverer computer 102 to the virtual meeting end devices, e.g., to the first, second, and third receiver computers 104a, 104b, 104c, as part of the virtual meeting. The audio recording may be saved in an uncompressed format, in a lossless compressed format, or in a lossy compressed format. The recorded audio may be in a digital file that includes one or more of a WAV file, an AIFF file, an ALAC file, a FLAC file, an MP3 file, an AAC file, a WMA file, and an OGG file. The recorded audio may be recorded in conjunction with video that is recorded via a camera at the presentation deliverer computer 102.

In a step 314 of the enhanced virtual meeting presentation process 300, the recorded audio is compared to triggers associated with content enhancement. The recorded audio from step 312 may be used for the comparisons in step 310. The triggers may be those that are received in step 220 and saved in the metadata in step 222 of the enhanced virtual meeting preparation process 200. With steps 312 and 314, the enhanced virtual meeting program 110a, 110b1, 110b2, 110b3, 110c, 110d, 110e may be considered to listen to the presenter audio to identify speech triggers to trigger content enhancement in the virtual meeting materials. The speech triggers may be considered as commands for the content enhancement, so that the enhanced virtual meeting program 110a, 110b1, 110b2, 110b3, 110c, 110d, 110e is said to listen for commands.

The various triggers that were received and stored in steps 220 and 222 may be stored all together organized in a list or may be separated into groups based on location segment in the virtual meeting in which the content enhancement was designated. Breaking the content enhancements into segments based on the segment of virtual meeting content being passed through may reduce processing required by the enhanced virtual meeting program 110a, 110b1, 110b2, 110b3, 110c, 110d, 110e, as fewer comparisons in the data must be made to find a match or to recognize that no match is present.

Step 314 may include speech-to-text transcription being performed by the enhanced virtual meeting program 110a, 110b1, 110b2, 110b3, 110c, 110d, 110e so as to allow the comparison of step 314 to occur via comparison of machine-encoded text. Thus, the enhanced virtual meeting program 110a, 110b1, 110b2, 110b3, 110c, 110d, 110e may include speech-to-text transcription capabilities. The speech-to-text audio recognition may include artificial intelligence and using or accessing one or more machine learning models trained to recognize words in spoken audio. This aspect of the present embodiments, therefore, includes artificial intelligence to carry out the dynamic meeting content enhancement. Any text produced in step 314 may be referred to as second machine-encoded text which is in contrast to the first machine encoded text that may be received in step 220 of the enhanced virtual meeting preparation process 200 shown in FIG. 2.

In some embodiments, the receiving of the speech trigger in step 220 of the enhanced virtual meeting preparation process 200 may include the receipt of recorded audio from the presenter, whereby the presenter speaks a trigger word, phrase or sound. This extra data may allow acoustic training of the machine learning model to better recognize a trigger word and to better recognize and interpret the voice of the presenter. This extra data may also allow the comparison of step 314 of the enhanced virtual meeting presentation process 300 to additionally include a comparison of audio files or to have this audio comparison as an alternative to comparing machine-encoded text. Such audio file to audio file comparison may in one embodiment include comparing frequencies of the audio signal, calculating a windowed discrete-time Fourier transformation, and computing cross-correlation in the spatial and frequency domain of the audio being compared. The comparing of audio files may also include analyzing and recognizing a voice signature and may include comparing waves, pitch, timbre, and inflection in the recorded audio files to identify matching characteristics and matching voice signature characteristics. The audio file to audio file matching may also include audio signal processing to generate pitch over time, frequency spectrum, autocorrelation, dynamic range, and transients of the signals to facilitate comparison.

In a step 316 of the enhanced virtual meeting presentation process 300, when triggers are identified the respective content presentation enhancement associated with the trigger is performed. The content presentation enhancements may include text highlighting, coloring, font changes, zooming, displaying polling questions, and screen synching according to those enhancements that were entered and saved for the meeting content in the enhanced virtual meeting preparation process 200.

Going along with the previous examples that were provided in the enhanced virtual meeting preparation process 200 regarding the content enhancements and triggers, if a match is identified that the presenter spoke the word "assembly" the enhanced virtual meeting program 110a, 110b1, 110b2, 110b3, 110c, 110d, 110e may highlight words between the beginning and end of the metadata tag for 5 seconds. If a match is identified that the presenter spoke the word "image" in conjunction with the presenter clicking on zoom point-and-click marker displayed on the screen of the presenter, the enhanced virtual meeting program 110a, 110b1, 110b2, 110b3, 110c, 110d, 110e may perform a zoom-plus zooming in action on an image at the designated slide location where the point-and-click marker appears. If a match is identified that the presenter spoke the word "poll", the enhanced virtual meeting program 110a, 110b1, 110b2, 110b3, 110c, 110d, 110e may generate and display the poll asking "What is the most common error on the assembly of this part?" and may request a poll response from meeting recipients. If a match is identified that the presenter spoke the word "main view", the enhanced virtual meeting program 110a, 110b1, 110b2, 110b3, 110c, 110d, 110e may perform a view synching action for all screens in the virtual meeting so that all screens, for the presenter and all meeting viewers, display the same view and content material.

The step 316 may include the virtual meeting running through all content enhancements that were designated in the enhanced virtual meeting preparation process 200 that was performed for this virtual meeting. After the last enhancement is performed, in some embodiments the audio recording and/or recording matching may be concluded, and the regular virtual meeting content materials may be presented.

In a step 318 of the enhanced virtual meeting presentation process 300, the virtual meeting is ended in response to receiving a meeting conclusion signal. The enhanced virtual meeting program 110a, 110c, 110d, 110e may generate a virtual meeting ending graphical user interface (GUI) component whose actuation may terminate the broadcast of the virtual meeting from the presentation deliverer computer 102 to the end devices, e.g., to the first, second, and third receiver computers 104a, 104b, 104c. The presenter or another administrator may use a keyboard 926, computer mouse 928, a microphone connected to the computer, a touch screen, or some other input device connected to the computer, e.g., to the presentation deliverer computer 102, to actuate such virtual meeting ending GUI component. The enhanced virtual meeting program 110a, 110c, 110d, 110e may display the virtual meeting ending GUI component on the display screen 924 or on a screen of the presentation deliverer computer 102. Another virtual meeting ending GUI component may be displayed on the screens of the end devices, e.g., on the screens of the first, second, and third receiver computers 104a, 104b, 104c, to allow the enhanced virtual meeting program 110b1, 110b2, 110b3, 110c, 110d, 110e to have the display of the virtual meeting to cease.

In a step 320 of the enhanced virtual meeting presentation process 300, user presentation preferences are stored for use in future virtual meetings. The viewer preferences may be saved in a memory that is part of the enhanced virtual meeting program 110a, 110b1, 110b2, 110b3, 110c, 110d, 110e or that is accessible to the enhanced virtual meeting program 110a, 110c, 110d, 110e. For example, end viewer presentation preferences may be saved in the database 114 shown in FIGS. 1A and 1B, in the RAM 908 that is shown in FIG. 5, in memory of the edge/gateway server 122 shown in FIG. 1B, in memory of the network edge server 120 shown in FIG. 1A, and/or in other memory in one or more remote servers that is accessible to the enhanced virtual meeting program 110a, 110b1, 110b2, 110b3, 110c, 110d, 110e via the 4G communication network 116, via the 5G communication network 130, and/or via a wired connection. Storing the viewer preferences at memory of the edge/gateway server 122 may reduce network traffic that is required during the presentation of the virtual meeting.

It may be appreciated that FIGS. 2, 3, and 4 provide illustrations of some embodiments and do not imply any limitations with regard to how different embodiments may be implemented. Many modifications to the depicted embodiment(s), e.g., to a depicted sequence of steps, may be made based on design and implementation requirements.

FIG. 5 is a block diagram 900 of internal and external components of computers depicted in FIG. 1 in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 902a, 902b, 904a, 904b is representative of any electronic device capable of executing machine-readable program instructions. Data processing system 902a, 902b, 904a, 904b may be representative of a smart phone, a computer system, PDA, or other electronic devices. Examples of computing systems, environments, and/or configurations that may represented by data processing system 902a, 902b, 904a, 904b include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

Presentation deliverer computer 102, first, second, and third receiver computers 104a, 104b, and 104c, server 112, edge/gateway server 122, and network edge server 120 may include respective sets of internal components 902a, 902b and external components 904a, 904b illustrated in FIG. 5. Each of the sets of internal components 902a, 902b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914 and the enhanced virtual meeting program 110a in presentation deliverer computer 102, the enhanced virtual meeting program 110c in server 112, the enhanced virtual meeting program 110d in network edge server 120, and the enhanced virtual meeting program 110e in the edge/gateway server 122 may be stored on one or more computer-readable tangible storage devices 916 for execution by one or more processors 906 via one or more RAMs 908 (which typically include cache memory). In the embodiment illustrated in FIG. 5, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory, or any other computer-readable tangible storage device that can store a computer program and digital information.

Each set of internal components 902a, 902b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the enhanced virtual meeting program 110a, 110b1, 110b2, 110b3, 110c, 110d, 110e, can be stored on one or more of the respective portable computer-readable tangible storage devices 920, read via the respective R/W drive or interface 918 and loaded into the respective hard drive 916.

Each set of internal components 902a, 902b may also include network adapters (or switch port cards) or interfaces 922 such as a TCP/IP adapter cards, wireless wi-fi interface cards, or 3G, 4G, or 5G wireless interface cards or other wired or wireless communication links. The enhanced virtual meeting program 110a in presentation deliverer computer 102, the enhanced virtual meeting program 110c in the server 112, the enhanced virtual meeting program 110d in network edge server 120, and the enhanced virtual meeting program 110e in the edge/gateway server 122 can be downloaded from an external computer (e.g., server) via a network (for example, the Internet, a local area network or other, wide area network) and respective network adapters or interfaces 922. From the network adapters (or switch port adaptors) or interfaces 922, the enhanced virtual meeting program 110a in presentation deliverer computer 102, the enhanced virtual meeting program 110c in server 112, the enhanced virtual meeting program 110d in network edge server 120, and the enhanced virtual meeting program 110e in the edge/gateway server 122 are loaded into the respective hard drive 916. The network may include copper wires, optical fibers, wireless transmission, routers, firewalls, switches, gateway computers and/or edge servers.

The network edge server 120 with the enhanced virtual meeting program 110d and the edge/gateway server 122 with the enhanced virtual meeting program 110e may include all internal components that the server 112 has. The network edge server 120 and the edge/gate ay server 122 are disposed, however, at different locations within the first networked computer environment 100A or within the second networked computer environment 100B.

Each of the sets of external components 904a, 904b can include a computer display monitor 924, a keyboard 926, and a computer mouse 928. External components 904a, 904b can also include touch screens, virtual keyboards, touch pads, pointing devices, and other human interface devices. Each of the sets of internal components 902a, 902b also includes device drivers 930 to interface to computer display monitor 924, keyboard 926 and computer mouse 928. The device drivers 930, R/W drive or interface 918 and network adapter or interface 922 include hardware and software (stored in storage device 916 and/or ROM 910).

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
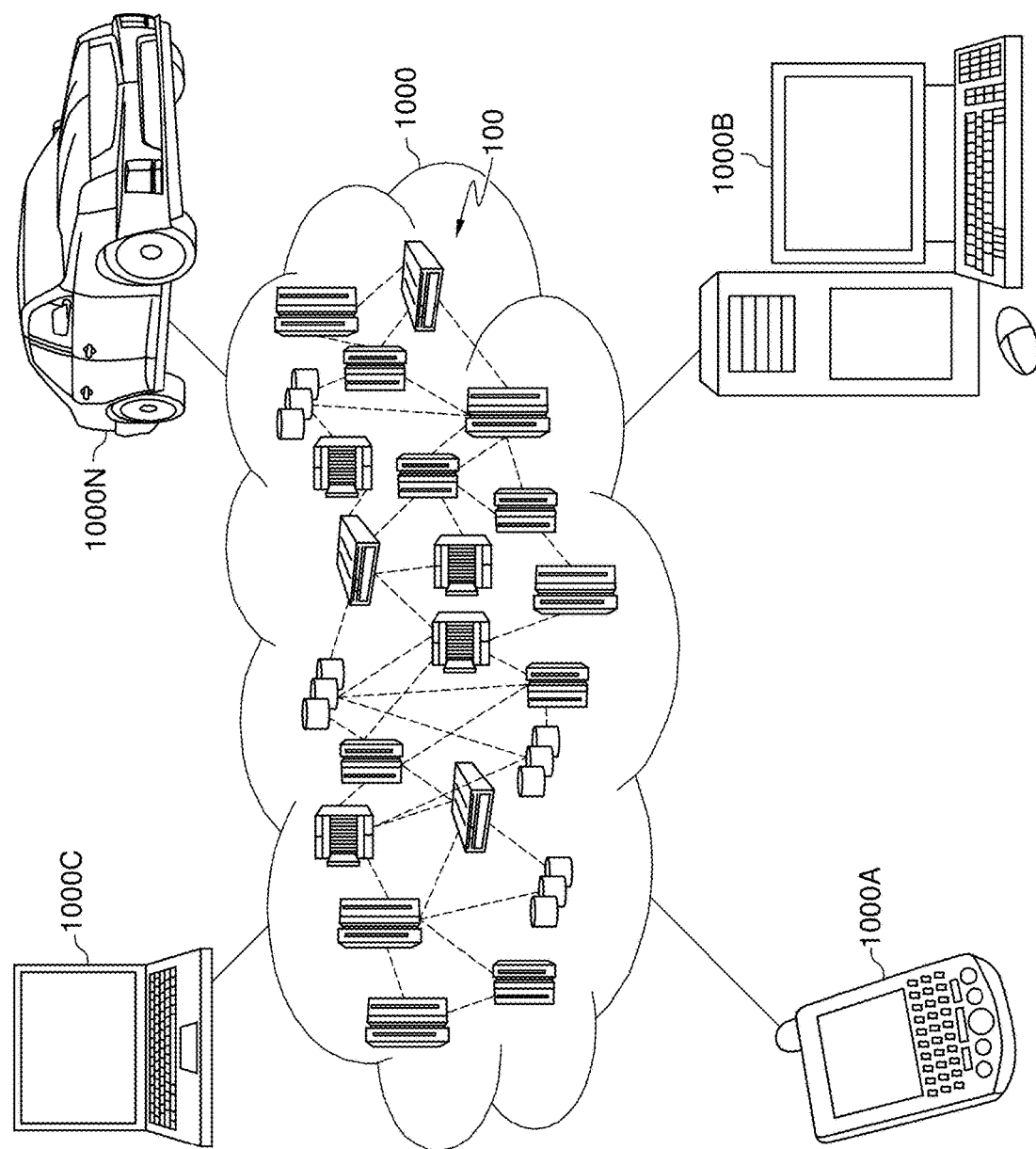
FIG. 6 is a block diagram of an illustrative cloud computing environment including the computer system depicted in FIG. 1, in accordance with an embodiment of the present disclosure.

Referring now to FIG. 6, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 6 are intended to be illustrative only and that computing nodes 100 and cloud computing environment 1900 can communicate with any type of computerized device over any type of network and/or network addressable connection (e.g., using a web browser).

Figure 7:
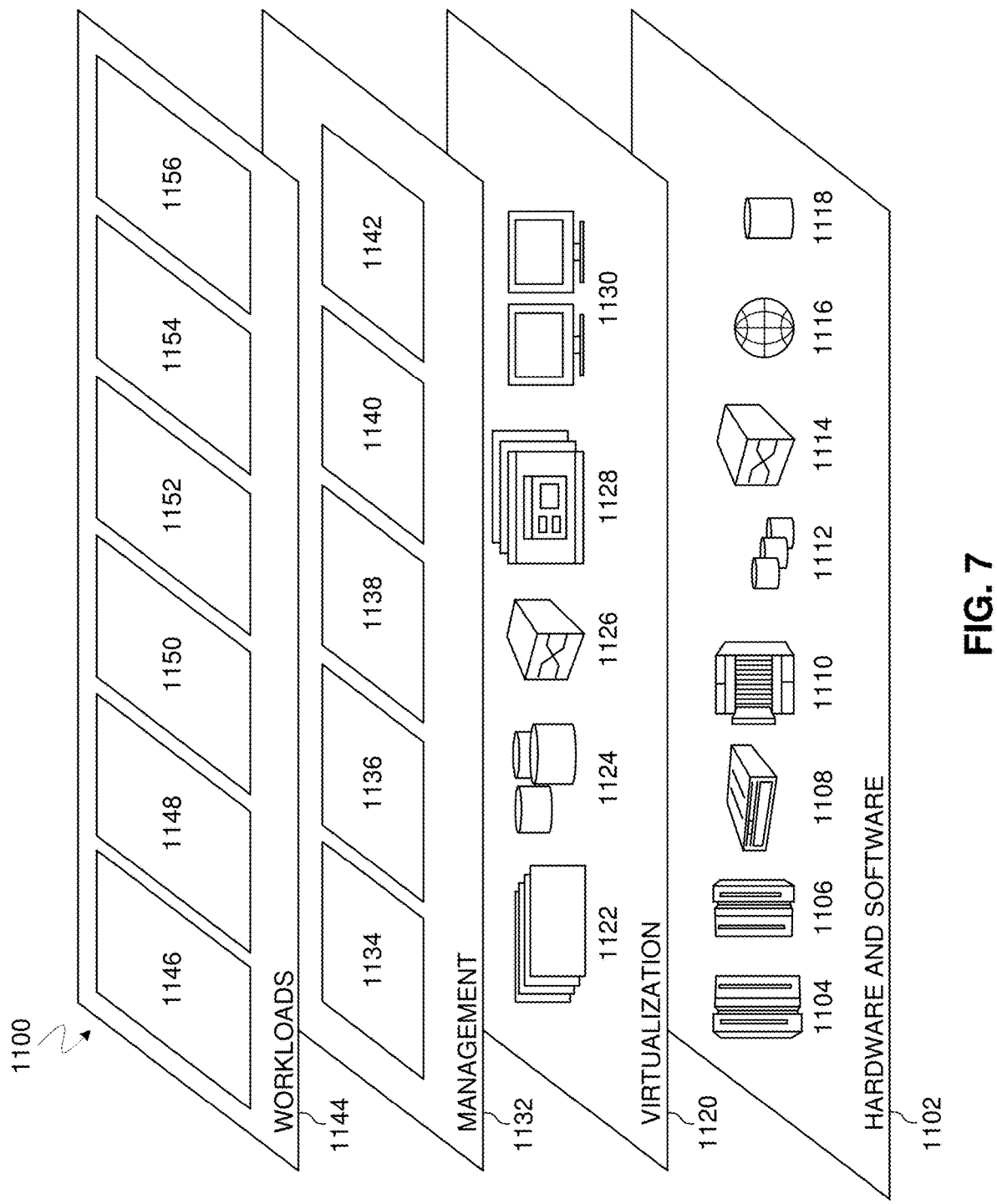
FIG. 7 is a block diagram of functional layers of the illustrative cloud computing environment of FIG. 6, in accordance with an embodiment of the present disclosure.

Referring now to FIG. 7, a set of functional abstraction layers 1100 provided by cloud computing environment 1000 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124;

virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and enhanced virtual meeting preparation and execution 1156. An enhanced virtual meeting program 110a, 110b1, 110b2, 110b3, 110c, 110d, 110e provides a way to increase engagement in virtual meetings and simplify the act of triggering enhanced content features while a presenter presents a virtual meeting to viewers viewing the presentation on their respective end devices.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for a digital remote presentation, the method comprising:
    receiving presentation content, the presentation content comprising visual content, one or more speech triggers, and one or more presentation enhancements corresponding to the one or more speech triggers, wherein the one or more speech triggers comprises first machine-encoded text of at least one keyword;
    transmitting the presentation content to at least one receiver computer for presentation of a virtual meeting;
    receiving a first audio file comprising recorded audio spoken by a presenter during the virtual meeting;
    identifying from the first audio file one or more components matching the one or more speech triggers, wherein the identifying comprises:
        performing speech-to-text transcription of the first audio file to produce second machine-encoded text and
        comparing the first machine-encoded text and the second machine-encoded text to find a match comprising the one or more speech triggers; and
    adjusting the transmitted presentation content according to a respective presentation enhancement corresponding to the identified speech trigger, wherein the adjusting is for presenting the one or more presentation enhancements to the at least one receiver computer during the virtual meeting.

2. The method of claim 1, wherein the one or more presentation enhancements comprises at least one member selected from the group consisting of a text enhancement, a zooming, a poll, and a view synching, wherein the view synching synchs screen views of a presenter device and of the at least one receiver computer.

3. The method of claim 1, further comprising storing the one or more speech triggers in metadata of the presentation content.

4. The method of claim 1, further comprising:
    receiving at least one user presentation preference from the at least one receiver computer; and
    altering the presentation content on the at least one receiver computer during the virtual meeting and according to the at least one user presentation preference.

5. The method of claim 4, wherein the at least one user presentation preference is selected from the group consisting of a font type, a font size, a zooming amount for an image, a background color, and a text color.

6. The method of claim 4, further comprising saving the at least one user presentation preference at a gateway server with respect to the at least one receiver computer.

7. A computer system for a digital remote presentation, the computer system comprising:
    one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system is capable of performing a method comprising:
        receiving presentation content, the presentation content comprising visual content, one or more speech triggers, and one or more presentation enhancements corresponding to the one or more speech triggers, wherein the one or more speech triggers comprises a preparation audio file;
        transmitting the presentation content to at least one receiver computer for presentation of a virtual meeting;
        receiving a first audio file comprising recorded audio spoken by a presenter during the virtual meeting;

identifying from the first audio file one or more components matching the one or more speech triggers, wherein the identifying comprises comparing the first audio file to the preparation audio file to find a match comprising the one or more speech triggers; and adjusting the transmitted presentation content according to a respective presentation enhancement corresponding to the identified one or more speech triggers, wherein the adjusting is for presenting the one or more presentation enhancements to the at least one receiver computer during the virtual meeting.

8. The computer system of claim 7, wherein the one or more speech triggers further comprises at least one member selected from the group consisting of a spoken word, a spoken phrase, and a sound.

9. The computer system of claim 7, wherein the one or more presentation enhancements comprises at least one member selected from the group consisting of a text enhancement, a zooming, a poll, and a view synching, wherein the view synching synchs screen views of a presenter device and of the at least one receiver computer.

10. The computer system of claim 7, wherein the method further comprises:
receiving at least one user presentation preference from the at least one receiver computer; and
altering the presentation content on the at least one receiver computer during the virtual meeting and according to the at least one user presentation preference.

11. A computer program product for a digital remote presentation, the computer program product comprising a non-transitory computer-readable storage medium having program instructions embodied therewith, wherein the program instructions are executable by a computer system to cause the computer system to perform a method comprising:
receiving presentation content, the presentation content comprising visual content, one or more speech triggers, and one or more presentation enhancements corresponding to the one or more speech triggers, wherein the one or more speech triggers comprises first machine-encoded text of at least one keyword;
transmitting the presentation content to at least one receiver computer for presentation of a virtual meeting;
receiving a first audio file comprising recorded audio spoken by a presenter during the virtual meeting;
identifying from the first audio file one or more components matching the one or more speech triggers, wherein the identifying comprises:
performing speech-to-text transcription of the first audio file to produce second machine-encoded text and
comparing the first machine-encoded text and the second machine-encoded text to find a match comprising the one or more speech triggers; and
adjusting the transmitted presentation content according to a respective presentation enhancement corresponding to the identified one or more speech triggers, wherein the adjusting is for presenting the one or more presentation enhancements is presented to the at least one receiver computer during the virtual meeting.

12. The computer program product of claim 11, wherein the one or more presentation enhancements comprises at least one member selected from the group consisting of a text enhancement, a zooming, a poll, and a view synching, wherein the view synching synchs views of a presenter device and of the at least one receiver computer.

13. The method of claim 1, wherein the one or more presentation enhancements comprises a text enhancement comprising a temporary highlighting of text.

14. The method of claim 13, wherein words indicating the text to be highlighted is found between metadata tags of metadata stored along with the received presentation content.

15. The method of claim 1, wherein the one or more presentation enhancements comprises a zoom in of an image that is part of the presentation content.

16. The computer system of claim 7, wherein the one or more presentation enhancements comprises a text enhancement comprising a temporary highlighting of text.

17. The computer system of claim 16, wherein words indicating the text to be highlighted is found between metadata tags of metadata stored along with the received presentation content.

18. The computer system of claim 7, wherein the one or more presentation enhancements comprises a zoom in of an image that is part of the presentation content.

19. The computer program product of claim 11, wherein the one or more presentation enhancements comprises a text enhancement comprising a temporary highlighting of text.

20. The computer program product of claim 19, wherein words indicating the text to be highlighted is found between metadata tags of metadata stored along with the received presentation content.

* * * * *